United States Patent
Karabinis et al.

(10) Patent No.: US 11,937,172 B1
(45) Date of Patent: Mar. 19, 2024

(54) SYSTEMS/METHODS OF A TWO-STEP PROCESS IN ESTABLISHING A CAPABILITY, AND USING THE CAPABILITY, TO EXECUTE A FINANCIAL TRANSACTION BY A SMARTPHONE

(71) Applicant: Telcom Ventures LLC, Miami, FL (US)

(72) Inventors: Peter D. Karabinis, Cary, NC (US); Rajendra Singh, Indian Creek Village, FL (US)

( * ) Notice: Subject to any disclaimer, the term of this patent is extended or adjusted under 35 U.S.C. 154(b) by 0 days.

(21) Appl. No.: 18/523,863

(22) Filed: Nov. 29, 2023

Related U.S. Application Data

(60) Division of application No. 18/489,517, filed on Oct. 18, 2023, which is a continuation of application No.
(Continued)

(51) Int. Cl.
| | |
|---|---|
| *H04W 4/80* | (2018.01) |
| *G06Q 30/0601* | (2023.01) |
| *H04L 67/52* | (2022.01) |
| *H04W 4/02* | (2018.01) |
| *H04W 4/029* | (2018.01) |

(Continued)

(52) U.S. Cl.
CPC ........ *H04W 48/04* (2013.01); *G06Q 30/0601* (2013.01); *H04L 67/52* (2022.05); *H04W 4/023* (2013.01); *H04W 4/029* (2018.02); *H04W 4/80* (2018.02); *H04W 76/10* (2018.02); *H04W 88/06* (2013.01)

(58) Field of Classification Search
CPC .............................. H04W 48/04; H04W 4/02
See application file for complete search history.

(56) References Cited

U.S. PATENT DOCUMENTS

| | | |
|---|---|---|
| 6,595,929 B2 | 7/2003 | Stivoric et al. |
| 6,769,607 B1 | 8/2004 | Pitroda et al. |
| | (Continued) | |

OTHER PUBLICATIONS

U.S. Patent and Trademark Office, "Non-Final Office Action", U.S. Appl. No. 18/489,517, dated Dec. 13, 2023, 7 pgs.
(Continued)

*Primary Examiner* — Michael T Vu
(74) *Attorney, Agent, or Firm* — Carlson, Caspers, Vandenburgh & Lindquist, P.A.

(57) ABSTRACT

Systems/Methods are disclosed of a two-step process in (i) establishing a capability at a smartphone to conduct a financial transaction and (ii) using the established capability in conducting the financial transaction by paying for a product. According to some embodiments, the first step of the two-step process is performed responsive to sensing at least one parameter and determining that the at least one parameter sensed satisfies a criterion; then, an authorization to establish said capability is requested. Then, responsive to receiving the authorization, the capability to conduct the financial transaction is established at the smartphone. The second step in said two-step process may be performed, comprising using said capability that has been established to conduct the financial transaction and pay for a product, responsive to the smartphone sensing proximity to an access point maintained by a vendor and responsive to the at least one parameter being sensed and satisfying the criterion.

16 Claims, 3 Drawing Sheets

Related U.S. Application Data

18/450,517, filed on Aug. 16, 2023, which is a continuation of application No. 17/653,748, filed on Mar. 7, 2022, now Pat. No. 11,770,756, which is a continuation of application No. 15/929,609, filed on May 12, 2020, now Pat. No. 11,304,118, which is a continuation of application No. 16/012,513, filed on Jun. 19, 2018, now Pat. No. 10,660,015, which is a division of application No. 15/800,885, filed on Nov. 1, 2017, now Pat. No. 10,219,199, which is a continuation of application No. 15/251,882, filed on Aug. 30, 2016, now Pat. No. 9,832,708, which is a continuation of application No. 12/264,711, filed on Nov. 4, 2008, now Pat. No. 9,462,411.

(51) Int. Cl.
   *H04W 48/04*   (2009.01)
   *H04W 76/10*   (2018.01)
   *H04W 88/06*   (2009.01)

(56) References Cited

U.S. PATENT DOCUMENTS

| | | | |
|---|---|---|---|
| 6,944,981 B1 | 9/2005 | Garberg et al. | |
| 6,957,107 B2 | 10/2005 | Rogers et al. | |
| 7,028,897 B2 | 4/2006 | Fernandes et al. | |
| 7,133,659 B2 | 11/2006 | Zalewski et al. | |
| 7,155,199 B2 | 12/2006 | Zalewski et al. | |
| 7,233,260 B2 * | 6/2007 | Tang | G08G 1/017 705/13 |
| RE39,736 E | 7/2007 | Morrill, Jr. | |
| 7,295,846 B2 | 11/2007 | Daigremont et al. | |
| 7,503,504 B2 | 3/2009 | Mitra | |
| 7,505,941 B2 | 3/2009 | Bishop et al. | |
| 7,539,241 B1 | 5/2009 | Dick | |
| 7,624,923 B2 | 12/2009 | Clark et al. | |
| 7,780,081 B1 | 8/2010 | Liang | |
| 7,822,644 B2 | 10/2010 | Alberth, Jr. et al. | |
| 7,912,629 B2 | 3/2011 | Sutter et al. | |
| 8,023,580 B2 | 9/2011 | Bremer | |
| 8,050,337 B2 | 11/2011 | Karabinis | |
| 8,091,780 B2 | 1/2012 | Todd et al. | |
| 8,249,935 B1 | 8/2012 | DiMartino et al. | |
| 8,463,238 B2 | 6/2013 | Forstall et al. | |
| 8,532,069 B2 | 9/2013 | Balwani | |
| 8,646,060 B1 | 2/2014 | Ayed | |
| 8,665,062 B2 | 3/2014 | Bragagnini et al. | |
| 8,965,281 B2 | 2/2015 | Raisanen et al. | |
| 2002/0170961 A1 | 11/2002 | Dickson et al. | |
| 2003/0172028 A1 | 9/2003 | Abell et al. | |
| 2003/0220105 A1 | 11/2003 | Daigremont et al. | |
| 2004/0030601 A1 | 2/2004 | Pond et al. | |
| 2004/0143505 A1 | 7/2004 | Kovach | |
| 2004/0143550 A1 | 7/2004 | Creamer et al. | |
| 2004/0170430 A1 | 9/2004 | Gorokhov | |
| 2005/0136949 A1 | 6/2005 | Barnes | |
| 2006/0009234 A1 | 1/2006 | Freer | |
| 2006/0085297 A1 | 4/2006 | Minerley | |
| 2006/0133633 A1 | 6/2006 | Hyvonen et al. | |
| 2006/0144933 A1 | 7/2006 | Do et al. | |
| 2006/0145893 A1 | 7/2006 | Hassett | |
| 2006/0159260 A1 | 7/2006 | Pereira et al. | |
| 2006/0165060 A1 | 7/2006 | Dua | |
| 2006/0172700 A1 | 8/2006 | Wu | |
| 2006/0194538 A1 | 8/2006 | Palin et al. | |
| 2007/0129077 A1 | 6/2007 | Iguchi et al. | |
| 2007/0167147 A1 | 7/2007 | Krasner et al. | |
| 2007/0178935 A1 | 8/2007 | Shim et al. | |
| 2007/0184837 A1 | 8/2007 | Hohl et al. | |
| 2007/0197261 A1 | 8/2007 | Humbel | |
| 2007/0198436 A1 | 8/2007 | Weiss | |
| 2007/0243872 A1 | 10/2007 | Gallagher et al. | |
| 2007/0250393 A1 | 10/2007 | Alberth et al. | |
| 2007/0260710 A1 | 11/2007 | Dowling | |
| 2007/0265984 A1 | 11/2007 | Santhana | |
| 2007/0285280 A1 | 12/2007 | Robinson et al. | |
| 2008/0040274 A1 | 2/2008 | Uzo | |
| 2008/0140667 A1 | 6/2008 | LaBiche | |
| 2008/0140868 A1 | 6/2008 | Kalayjian et al. | |
| 2008/0146148 A1 | 6/2008 | Hulvey | |
| 2008/0167966 A1 | 7/2008 | Ramsdale et al. | |
| 2008/0200166 A1 | 8/2008 | McCamon | |
| 2008/0227471 A1 | 9/2008 | Dankar et al. | |
| 2008/0306868 A1 | 12/2008 | Robinson et al. | |
| 2009/0023474 A1 | 1/2009 | Luo et al. | |
| 2009/0058637 A1 | 3/2009 | Kuo et al. | |
| 2009/0113543 A1 | 4/2009 | Adams et al. | |
| 2009/0153367 A1 | 6/2009 | Lee | |
| 2009/0169070 A1 | 7/2009 | Fadell | |
| 2009/0213947 A1 | 8/2009 | Rao et al. | |
| 2010/0067591 A1 | 3/2010 | Luo et al. | |
| 2010/0265845 A1 | 10/2010 | Lampén | |
| 2011/0314539 A1 | 12/2011 | Horton | |
| 2012/0214443 A1 | 8/2012 | Daigle | |
| 2013/0156218 A1 | 6/2013 | Annacone et al. | |

OTHER PUBLICATIONS

"Digital wallet" Wikipedia (4 pages) (Printed on Jul. 10, 2017).
"What are Physiological Biometrics?" THALES, Mar. 2023, www.thalesgroup.com/en/markets/digital-identity-and-security/government/inspired/what-are-physiological-biometrics#:~:text=A%20fingerprint%20is%20an%20example,and%20characteristics%20of%20your%20body. Accessed Jun. 20, 2023.
Caen, the city where you pay and get information by taking out your cell phone. 01net.com. Oct. 20, 2005. Retrieved on Oct. 4, 2023 from https://www.01net.com/actualites/caen-la-ville-ou-lon-paye-et-sinforme-en-sortant-son-portable-292660.html.
Google search results, "when did apple introduce the fingerprint sensor on the iphone?", https://www.google.com/search?q=when+did+apple+introduce+the+fingerprint+sensor+on+the+iphone%3F&rlz=1C5CHFA_enUS1053US1053&oq=&aqs=chrome.0.69i59i45018.2238j0j15&sourceid=chrome&ie=UTF-8. Searched Oct. 17, 2023.
Google search results, "When was the first iphone released", https://www.google.com/search?q=when+was+the+first+iphone+released&rlz=1C5CHFA_enUS1053US1053&oq=&aqs=chrome.0.69i59i45018.11471j0j15&sourceid=chrome&ie=UTF-8#vhid=qRi4cJnW7gdnuM&vssid=l. Searched Oct. 17, 2023.
In Hanau, the mobile bus ticket is at the right price. 01net.com. May 2, 2005. Retrieved on Oct. 17, 2023 from https://www.01net.com/actualites/a-hanau-le-portable-ticket-de-bus-joue-au-juste-prix-276000.html.
International Search Report and Written Opinion of the International Searching Authority for corresponding PCT Application No. PCT/US09/062792 (8 pages) (dated Dec. 23, 2009).
J. Weatherbed, "10 years ago, Apple finally convinced us to lock our phones / Before Touch ID and fingerprint scanners, most of us couldn't be bothered to set a PIN or password to protect our mobile devices." The Verge. Sep. 12, 2023. Retrieved on Oct. 17, 2023 from https://www.theverge.com/23868464/apple-iphone-touch-id-fingerprint-security-ten-year-anniversary.
Telecoms—The contactless mobile revolution arrives in 2008. banquedesterritoires.fr. Dec. 21, 2007. Retrieved on Oct. 4, 2023 from https://www.banquedesterritoires.fr/la-revolution-mobile-sans-contact-arrive-en-2008.
U.S. Patent and Trademark Office, "Final Office Action", U.S. Appl. No. 15/929,609, dated Jun. 9, 2021, 17 pgs.
U.S. Patent and Trademark Office, "Final Rejection", U.S. Appl. No. 16/012,513, dated Dec. 11, 2018, pp. 1-10.
U.S. Patent and Trademark Office, "Final Rejection", U.S. Appl. No. 16/012,513, dated Dec. 19, 2019, pp. 1-14.
U.S. Patent and Trademark Office, "Final Rejection", U.S. Appl. No. 16/251,834, dated Dec. 17, 2019, pp. 1-14.
U.S. Patent and Trademark Office, "Non-Final Office Action", U.S. Appl. No. 17/653,748, dated Jun. 8, 2023, 19 pgs.
U.S. Patent and Trademark Office, "Notice of Allowance", U.S. Appl. No. 15/929,609, dated Dec. 9, 2021, 4 pgs.

(56) References Cited

OTHER PUBLICATIONS

U.S. Patent and Trademark Office, "Notice of Allowance", U.S. Appl. No. 16/012,513, dated Mar. 26, 2020, pp. 1-12.
U.S. Patent and Trademark Office, "Notice of Allowance", U.S. Appl. No. 16/251,834, dated Apr. 22, 2020, pp. 1-9.
U.S. Patent and Trademark Office, "Notice of Allowance", U.S. Appl. No. 17/653,748, dated Jul. 17, 2023, 9 pgs.
U.S. Patent and Trademark Office, "Office Action", U.S. Appl. No. 15/929,609, dated Jun. 9, 2021, 18 pgs.
U.S. Patent and Trademark Office, "Office Action", U.S. Appl. No. 15/929,609, dated Dec. 1, 2020, 16 pgs.
U.S. Patent and Trademark Office, "Office Action", U.S. Appl. No. 16/012,513, dated Apr. 12, 2019, pp. 1-11.
U.S. Patent and Trademark Office, "Office Action", U.S. Appl. No. 16/012,513, dated Jul. 31, 2018, pp. 1-8.
U.S. Patent and Trademark Office, "Office Action", U.S. Appl. No. 16/251,834, dated May 9, 2019, pp. 1-10.
U.S. Patent and Trademark Office, "Restriction Requirement", U.S. Appl. No. 18/489,517, dated Nov. 28, 2023, 8 pgs.
U.S. Patent and Trademark Office, "Supplemental Notice of Allowability", U.S. Appl. No. 17/653,748, dated Jul. 28, 2023, 4 pgs.
U.S. Patent and Trademark Office, "Notice of Allowance", U.S. Appl. No. 18/489,517, dated Jan. 12, 2024, 12 pgs.

\* cited by examiner

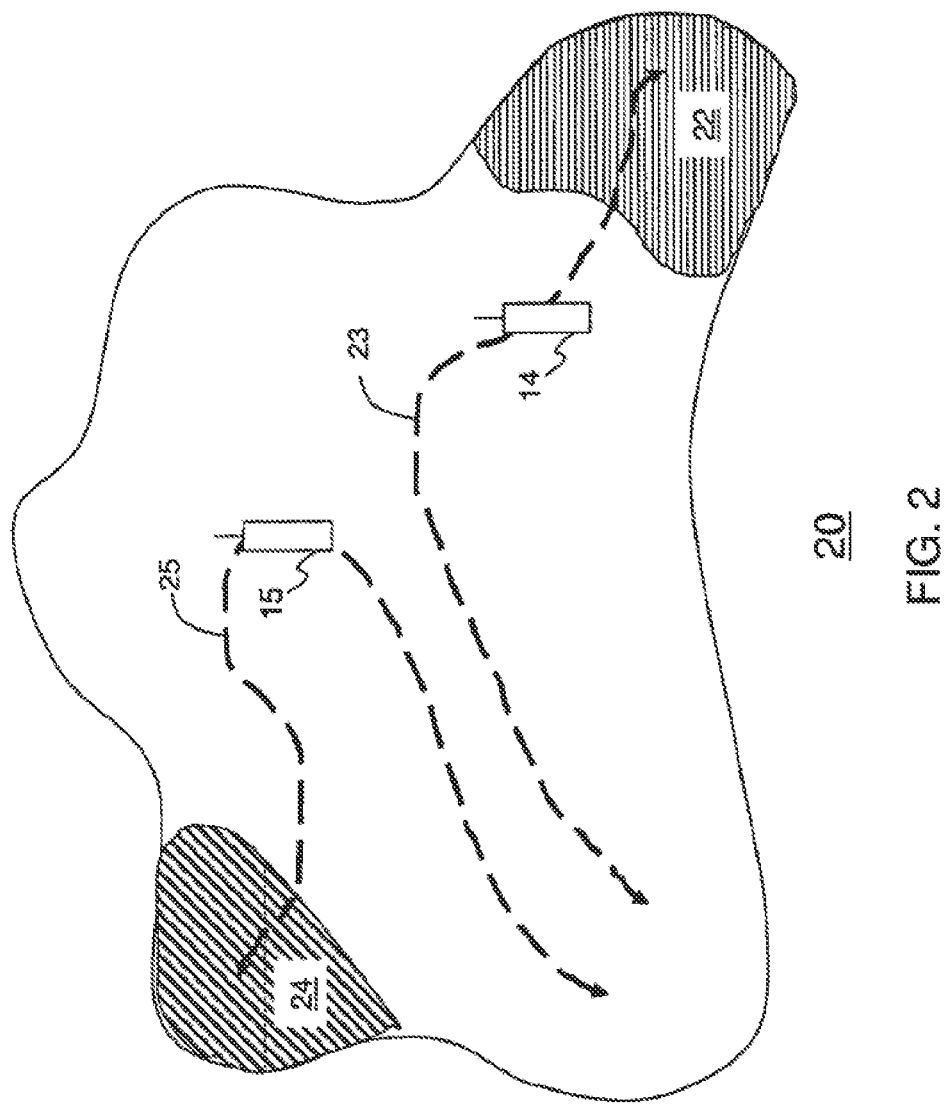

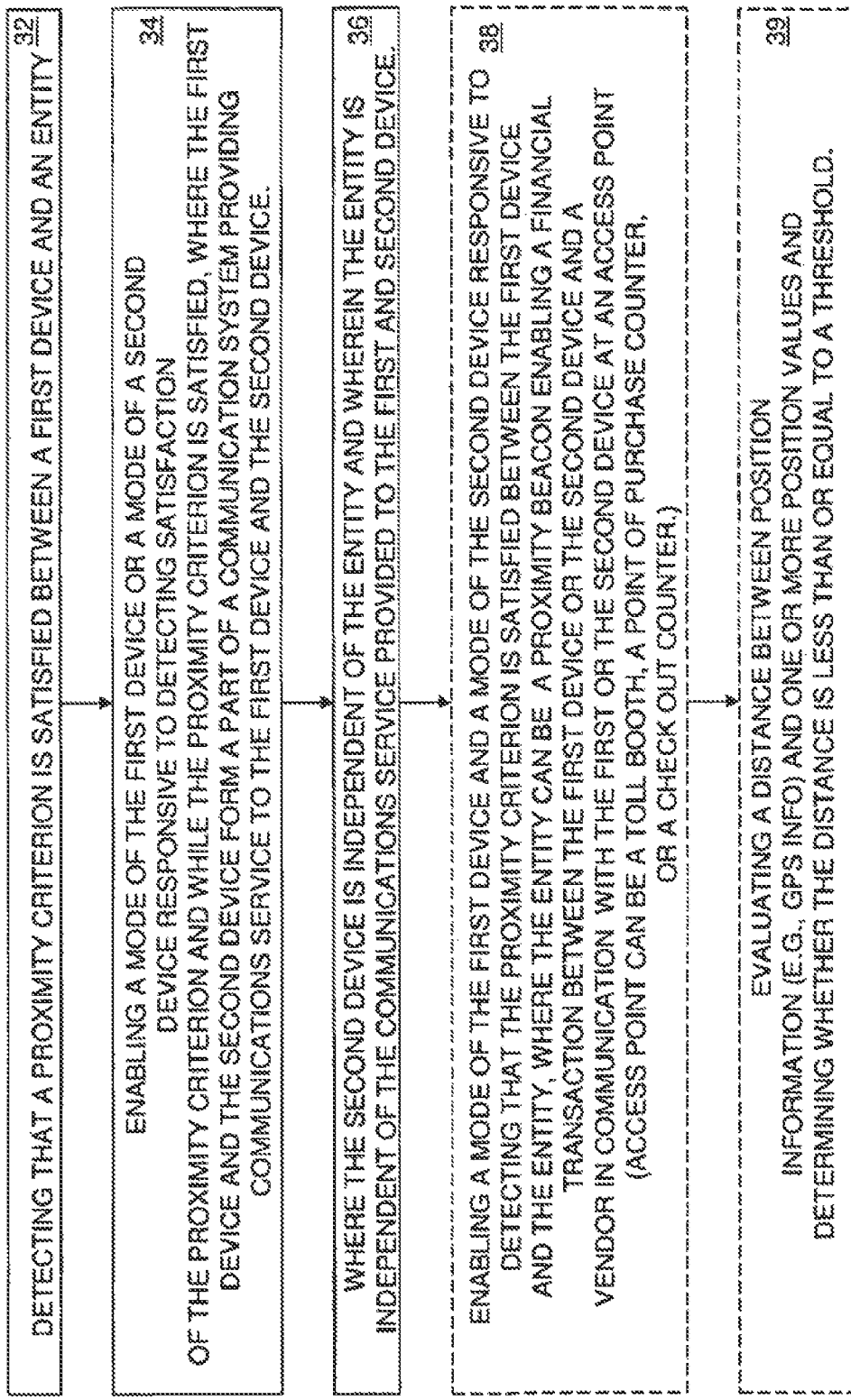

FIG. 3  30

32 DETECTING THAT A PROXIMITY CRITERION IS SATISFIED BETWEEN A FIRST DEVICE AND AN ENTITY

34 ENABLING A MODE OF THE FIRST DEVICE OR A MODE OF A SECOND DEVICE RESPONSIVE TO DETECTING SATISFACTION OF THE PROXIMITY CRITERION AND WHILE THE PROXIMITY CRITERION IS SATISFIED, WHERE THE FIRST DEVICE AND THE SECOND DEVICE FORM A PART OF A COMMUNICATION SYSTEM PROVIDING COMMUNICATIONS SERVICE TO THE FIRST DEVICE AND THE SECOND DEVICE.

36 WHERE THE SECOND DEVICE IS INDEPENDENT OF THE ENTITY AND WHEREIN THE ENTITY IS INDEPENDENT OF THE COMMUNICATIONS SERVICE PROVIDED TO THE FIRST AND SECOND DEVICE.

38 ENABLING A MODE OF THE FIRST DEVICE AND A MODE OF THE SECOND DEVICE RESPONSIVE TO DETECTING THAT THE PROXIMITY CRITERION IS SATISFIED BETWEEN THE FIRST DEVICE AND THE ENTITY, WHERE THE ENTITY CAN BE A PROXIMITY BEACON ENABLING A FINANCIAL TRANSACTION BETWEEN THE FIRST DEVICE OR THE SECOND DEVICE AND A VENDOR IN COMMUNICATION WITH THE FIRST OR THE SECOND DEVICE AT AN ACCESS POINT (ACCESS POINT CAN BE A TOLL BOOTH, A POINT OF PURCHASE COUNTER, OR A CHECK OUT COUNTER.)

39 EVALUATING A DISTANCE BETWEEN POSITION INFORMATION (E.G., GPS INFO) AND ONE OR MORE POSITION VALUES AND DETERMINING WHETHER THE DISTANCE IS LESS THAN OR EQUAL TO A THRESHOLD.

SYSTEMS/METHODS OF A TWO-STEP PROCESS IN ESTABLISHING A CAPABILITY, AND USING THE CAPABILITY, TO EXECUTE A FINANCIAL TRANSACTION BY A SMARTPHONE

CROSS-REFERENCE TO RELATED APPLICATION

The present application is a divisional of U.S. application Ser. No. 18/489,517, filed on Oct. 18, 2023, which is a continuation of U.S. application Ser. No. 18/450,517, filed Aug. 16, 2023, which is a continuation of U.S. application Ser. No. 17/653,748, filed Mar. 7, 2022, now U.S. Pat. No. 11,770,756, which is a continuation of U.S. application Ser. No. 15/929,609, filed May 12, 2020, now U.S. Pat. No. 11,304,118, which is a continuation of U.S. application Ser. No. 16/012,513, filed Jun. 19, 2018, now U.S. Pat. No. 10,660,015, which is a divisional of U.S. application Ser. No. 15/800,885, filed Nov. 1, 2017, now U.S. Pat. No. 10,219,199, which is a continuation of U.S. application Ser. No. 15/251,882, filed Aug. 30, 2016, now U.S. Pat. No. 9,832,708, which is a continuation of U.S. application Ser. No. 12/264,711, filed Nov. 4, 2008, now U.S. Pat. No. 9,462,411. The disclosures of which are hereby incorporated herein by reference as if set forth fully herein.

FIELD OF THE INVENTION

This invention relates to systems, devices and/or methods that may be used to provide an adaptive enablement of one or more communications modes based upon having satisfied a proximity criterion. The one or more communications modes may be one or more wireless and/or non-wireless communications modes.

BACKGROUND OF THE INVENTION

Adaptivity and mobility aspects of wireless communications are becoming more important in people's lives. People are relying more and more on mobile wireless devices to perform an ever-increasing suite of functions such as, for example, navigation, e-mail, web surfing, streaming video, etc. However, there is a rigidity aspect that is associated with wireless mobile devices in that a wireless mobile device is typically configured to be capable of performing a predetermined number of functions independent of its location, Time-of-Day (ToD), velocity, acceleration, temperature, sensing of a signal, etc. It would, for example, be desirable to have a mobile wireless device act as a "wallet" (over and above other functions) only when it is time to pay for an item and not act as a wallet when there is no need to do so.

The present invention, addresses these limitations (i.e., the rigidity) of current wireless mobile devices. Accordingly, embodiments of the present invention provide systems, devices and/or methods that may be used to enable adaptively one or more modes/functions of a device based upon having satisfied by the device (or another device) a proximity condition/criterion.

As used herein, the term "end-user device," "wireless mobile device," "mobile wireless device" or simply "device" includes any electronic device that may be used to transmit/receive information wirelessly and/or non-wirelessly such as, for example, a Digital Subscriber Line (DSL) modem/transceiver; a cable modem/transceiver; a cellular and/or satellite radiotelephone with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; laptop and/or palmtop computers or other appliances, which may (or may not) include a radio frequency transceiver.

An end-user device also may be referred to herein as a radiotelephone, radioterminal, mobile terminal, user device, wireless device, device and/or terminal; etc. As used herein, the term end-user device and/or any of its synonyms also include(s) any other radiating device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s).

BRIEF DESCRIPTION OF THE DRAWINGS

FIG. 2 depicts another communication system that detects a proximity criterion in accordance with the claimed embodiments;

FIG. 3 is a flow chart illustrating a method of detecting proximity criterion and enabling functions or modes on devices in accordance with the claimed embodiments.

DETAILED DESCRIPTION

Figure 1:
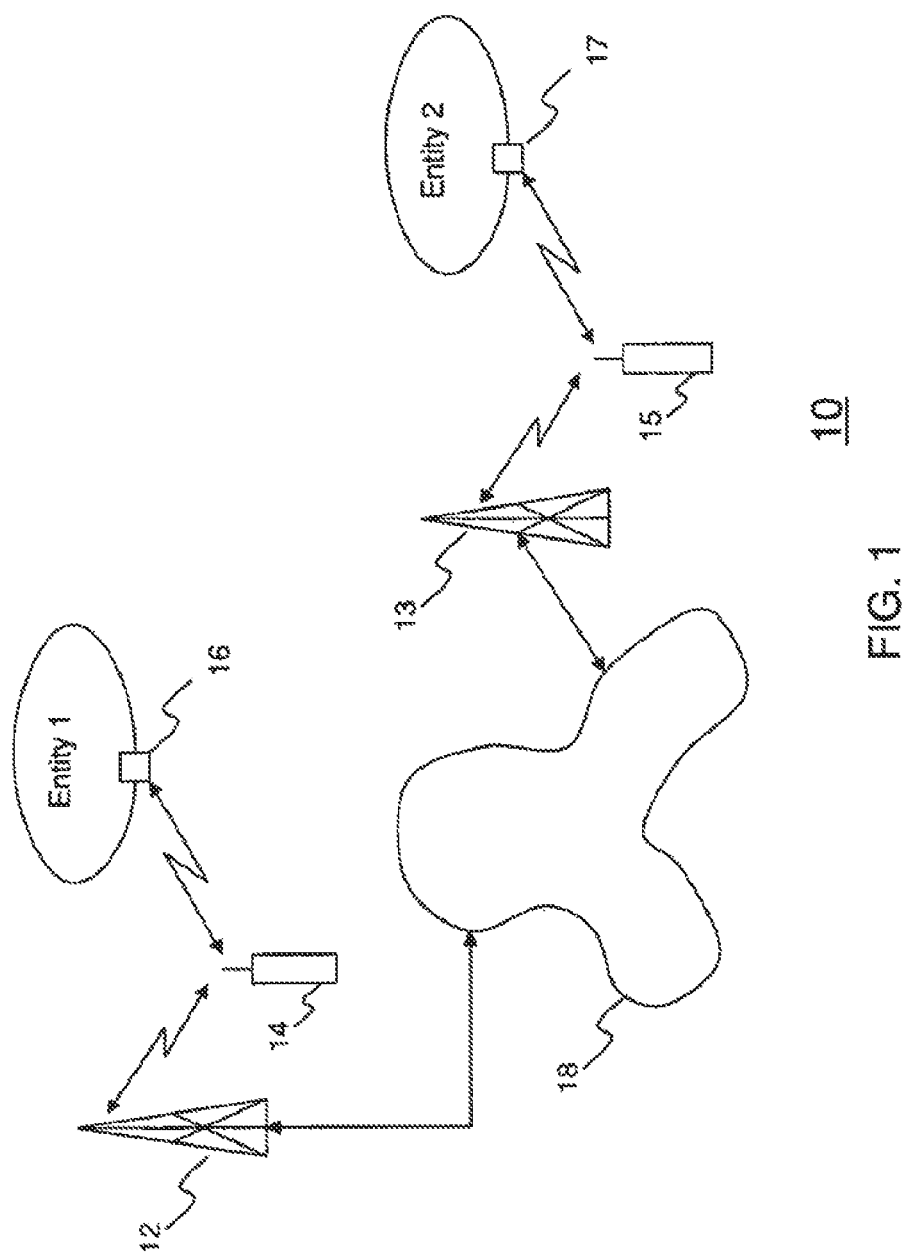
FIG. 1 depicts a communication system that detects a proximity criterion in accordance with the claimed embodiments.

The present invention now will be described more fully hereinafter with reference to specific embodiments and/or the accompanying drawing(s), in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected," "coupled" and/or "responsive" to another element, it can be directly connected, coupled and/or responsive to the other element or intervening elements may be present. Furthermore, "connected," "coupled" and/or "responsive" as used herein may include wirelessly connected, coupled and/or responsive. The terminology used herein is for the purpose of describing particular embodiments only and is not intended to be limiting of the invention. As used herein, the singular forms "a," "an" and/or "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Furthermore, it will be understood that although terms such as, for example, first and second may be used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "I" is also used as a shorthand notation for "and/or."

A mobile device such as, for example, a wireless communications device (e.g., a wireless terminal, a wireless/mobile phone, a Personal Digital Assistant (PDA), a smart phone, a multi-media device including Global Positioning System (GPS) capability, etc.) and/or one or more systems that is/are providing service to the mobile device and/or to a device other than the mobile device, may be configured to enable one or more modes/functions of the mobile device and/or of the device other than the mobile device, responsive to a proximity criterion having been satisfied.

In some embodiments, determining whether the proximity criterion is satisfied comprises determining by the mobile device and/or by the one or more systems of a location associated with the mobile device. In other embodiments, determining whether the proximity criterion is satisfied comprises determining by the device other than the mobile device and/or by the one or more systems of a location that is associated with the device other than the mobile device. The determining by the mobile device, by the device other than the mobile device and/or by the one or more systems may, in some embodiments, comprise reception and/or processing of GPS signals in order to determine a Time-of-Day (ToD), Time-of-Month (ToM), Time-of-Year (ToY), velocity, acceleration and/or position (in three-dimensional space). In other embodiments, the determining may be based upon the mobile device and/or the device other than the mobile device detecting a signal that is being radiated by a device that is attached to and/or is installed in/on an entity (i.e., a device that is associated with the entity). In still further embodiments, the device other than the mobile device may send a message to the mobile device requesting enablement of one or more modes/functions of the mobile device and/or of the device other than the mobile device and, responsive to an affirmative response by the mobile device, the mobile device and/or the device other than the mobile device may enable the one or more modes/functions of the mobile device and/or of the device other than the mobile device.

The entity may, for example, be a person, an animal, a vehicle (ground-based, maritime and/or aeronautical), a building (residential, commercial and/or office), a product that is for sale, a store that sells one or more products, a check-out counter in a store, a shopping cart that may be used by a customer to carry one or more products selected by the customer for purchase, one or more locations in time and/or space, a geographic area and/or a multi-dimensional region in time and/or space.

The signal that is being radiated by the device that is attached to and/or is installed in the entity may include an element that may be a priori known by the mobile device and/or by the device other than the mobile device. As such, according to some embodiments, the mobile device and/or the device other than the mobile device may, when proximate to the entity, receive the signal that is being radiated by the device that is attached to and/or is installed in the entity, detect the element that may be a priori known by the mobile device and/or by the device other than the mobile device and thus determine that the mobile device and/or the device other than the mobile device is proximate to the entity.

It will be understood that the signal that is being radiated by the device that is attached to and/or is installed in the entity may be radiated at a relatively low power level so that it may be detected by the mobile device and/or by the device other than the mobile device only over a relatively small distance between, for example, the mobile device and the device that is attached to and/or is installed in the entity (e.g., over a distance that is, for example, less than 100 meters, in some embodiments or less than 10 meters, in other embodiments). It will also be understood that the element that may be a priori known by the mobile device and/or by the device other than the mobile device may comprise an identity associated with the entity. In some embodiments, the identity may comprise a number, a word/name, a location, a Time-of-Day (ToD), a unique code, a region of space and/or time, etc.

According to some embodiments, the mobile device and/or the device other than the mobile device may be configured so that a user of the mobile device and/or a user of the device other than the mobile device, a service provider providing service to the mobile device and/or providing service to the device other than the mobile device and/or a manufacturer of the mobile device and/or the device other than the mobile device may program the mobile device and/or the device other than the mobile device to recognize the element and/or the identity associated with the entity.

A number of examples/applications of the concepts disclosed above will now be described to further illustrate the scope and spirit of the present invention to those skilled in the art.

Example/Application No. 1: A motor vehicle, such as, for example, a car, may be configured with a low-power radiator that radiates a signal that includes an identity of the motor vehicle, a velocity of the motor vehicle, an acceleration of the motor vehicle, a position of the motor vehicle, a Time-of-Day (ToD), a Time-of-Month (ToM), a Time-of-Year (ToY) and/or an indication of a content of the motor vehicle. Now imagine a person who is associated with the motor vehicle (e.g., an owner/driver of the motor vehicle) is approaching the motor vehicle. Let us assume that the person who is approaching the motor vehicle and is associated with the motor vehicle carries a wireless communications device. The wireless communications device may be configured to sense the signal that is being radiated by the low-power radiator, detect the identity of the motor vehicle and compare the detected identity with one or more a priori identities that are stored in the wireless communications device. If a match is found, the communications device may be configured to selectively enable, responsive to the match, for example, a "pay toll" function. Accordingly, as the motor vehicle approaches an access point that is configured to radiate a signal associated with toll collection, the communications device, responsive to having detected the signal associated with toll collection, may be configured to transmit information that may be used by the access point and/or by an associated toll collection system that may be connected to the access point to debit an account that is associated with a user and/or owner of the communications device. In further embodiments of the present invention, if the match is found, the communications device may be configured to selectively enable, responsive to the match and responsive to a velocity of the motor vehicle, an acceleration of the motor vehicle, a position of the motor vehicle, a Time-of-Day (ToD), a Time-of-Month (ToM), a Time-of-Year (ToY) and/or a content of the motor vehicle, for example, the "pay toll" function. It will be understood that the velocity of the motor vehicle, the acceleration of the motor vehicle, the position of the motor vehicle, the ToD, the ToM and/or the ToY may be provided by the communications device (based on GPS signal processing, and/or based on any other means, that may be performed/implemented by the communications device and/or by a network that may be providing service to the communications device) and/or by the motor vehicle.

The wireless communications device may be configured to keep the pay toll function enabled for as long as the wireless communications device is able to sense the signal that is being radiated by the low-power radiator (i.e., the signal that includes an identity of the motor vehicle) and to selectively disable the pay toll function a short time after the wireless communications device is no longer able to sense the signal that is being radiated by the low-power radiator. In further embodiments, the wireless communications device may be configured to keep the pay toll function enabled as long as the wireless communications device is able to sense the signal that is being radiated by the low-power radiator and a specific value (or values) associated with at least one of a velocity of the motor vehicle, an acceleration of the motor vehicle, a position of the motor vehicle, a ToD, a ToM, a ToY and a content of the motor vehicle is/are being met/satisfied.

In accordance with some embodiments, even though the wireless communications device does not find a match but is able to sense the signal that is being radiated by the low-power radiator, the wireless communications device may be configured to provide a notification (e.g., a sound, a vibration, a light and/or an alpha-numeric display, etc.). Responsive to the notification, a user of the wireless communications device may instruct (for example, manually or via voice command) the wireless communications device to enable the pay toll function.

In further embodiments, a second wireless communications device that belongs to and/or is being used by a second person, senses a signal and, responsive to having sensed the signal (whether a match is found or not) sends a request selectively to a first wireless communications device. Responsive to the request, the first wireless communications device sends an acknowledgement and/or an authorization to the second wireless communications device. Responsive to the acknowledgement and/or authorization the second wireless communications device selectively enables a mode which, according to some embodiments, is the pay toll function. It will be understood that the first and second wireless communications devices may, according to some embodiments, be predetermined to function as described above. That is, the first wireless communications device acting as a "master" and the second wireless communications device acting as a "slave" in that the second wireless communications device is configured to enable a mode/function thereof responsive to a detection/match and responsive to receiving an authorization from the first wireless communications device. If the mode/function comprises paying for a transaction, an amount of money associated with the paying may be deducted/withdrawn from an account associated with an owner/user of the first wireless communications device.

Thus, according to some embodiments, the first wireless communications device functions independently and/or autonomously whereas the second wireless communications device functions dependently on the first wireless communications device, at least as far as at least one of its modes/functions is concerned. The master-slave relationship between the first and second wireless communications devices may, according to some embodiments, be predetermined. In other embodiments, the master-slave relationship may not be predetermined and may be negotiated and/or established, as a need for such a relationship arises, by exchanging information between the first and second wireless communications devices. It will be understood that, in some embodiments, at least one of the first and second wireless communications devices may not be a wireless communications device.

Example/Application No. 2: A wireless communications device may be configured to estimate a location associated therewith and may also be configured to estimate a value of at least one other parameter that may be associated with the wireless communications device, an environment thereof and/or an entity (living or otherwise) that is associated with and/or is proximate to the wireless communications device. The "at least one other parameter" may, for example, be a velocity, acceleration, ToD, ToM, ToY, humidity, temperature, height, level of brightness, level of darkness, a blood pressure, a heart rate, a blood content, a physiological state, a psychological state, etc. As those skilled in the art will appreciate, the wireless communications device may be configured to estimate its location and the value of the "at least one other parameter" by, for example, processing GPS signals and/or by using other means and/or sensors that may, according to some embodiments, be device-based and/or network assisted/based means and/or sensors.

According to some embodiments, the wireless communications device may be configured to make a comparison between an estimate of its location and one or more other locations, that may be one or more other predetermined and/or pre-stored locations, and the wireless communications device may be configured to selectively enable a first communications mode/function responsive to an outcome of the comparison and/or to selectively disable a second communications mode/function responsive to the outcome of the comparison. In other embodiments, the wireless communications device may be configured to selectively enable the first communications mode/function responsive to the outcome of the comparison and/or responsive to a value of another parameter, such as, for example, a value associated with the "at least one other parameter" list and/or selectively disable the second communications mode/function responsive to the outcome of the comparison and/or responsive to a value of another parameter, such as, for example, a value associated with the "at least one other parameter" list.

For example, in some embodiments, if a comparison between an estimate of location of the wireless communications device and the one or more locations that are predetermined and/or pre-stored reveals a distance therebetween that is less than or equal to a threshold, the wireless communications device may be configured to selectively and/or preferentially enable a first communications mode, that may be one communications mode of a plurality of communications modes, that uses, for example, a first air interface protocol and a first set of frequencies to communicate information wirelessly (wherein the first set of frequencies may be a predetermined first set of frequencies), while refraining from using (and/or using only infrequently and/or as a last resort depending on an emergency, need and/or a priority) a second communications mode, of the plurality of communications modes, comprising a second set of frequencies and/or a second air interface protocol. In some embodiments, refraining from using (and/or using only infrequently and/or as a last resort depending on an emergency, need and/or a priority) a second communications mode comprises selectively and/or preferentially disabling the second communications mode that uses, for example, the second air interface protocol and/or the second set of frequencies. It will be understood that, according to some embodiments, the first and/or second air interface protocols may be predetermined and that the first and/or second set of frequencies may also be predetermined. In further embodiments, at least one of the first air interface protocol, the second air interface protocol, the first set of frequencies and the second set of frequencies may not be predetermined and may be determined as required responsive to receiving a message, sensing/detecting at least a portion of an electromagnet spectrum and/or via other means such as, for example, a user choice/preference/command.

In some embodiments, the first communications mode may comprise an air interface protocol, such as, for example, an Orthogonal Frequency Division Multiplexed and/or an Orthogonal Frequency Division Multiple Access (OFDM/OFDMA) protocol, a WiFi- and/or WiMAX-based air interface protocol that may be based upon Time Division Duplex (TDD) operation wherein a common set of frequencies are used bi-directionally (at different times) to provide uplink and downlink communications, and the first and/or second set of frequencies may comprise, for example, an unlicensed use and/or a licensed use set of frequencies.

In further embodiments, the wireless communications device may further be configured to selectively enable (or to prefer) a first communications mode and/or to selectively refrain from using (or avoid from using unless a level of priority and/or other reason is provided) a second communications mode, responsive to the comparison of position that was discussed earlier and/or responsive to a value of a quantity/parameter, such as, for example, a value associated with the "at least one other parameter" and/or responsive to an event (man-caused or natural). The first communications mode may comprise a first air interface protocol and a first set of frequencies for transmission/reception of information and the second communications mode may comprise a second air interface protocol, that may be different from the first air interface protocol, and/or a second set of frequencies for transmission and/or reception of information that may be different (or at least partially different) from the first set of frequencies.

The wireless communications device may be configured to repeatedly make a decision based on the comparison of position that was discussed earlier, based on the value of a quantity/parameter, such as, for example, a value associated with the "at least one other parameter" and/or based on the event (man-caused and/or natural), to maintain the first communications mode enabled and/or to maintain the second communications mode disabled for as long as the comparison of position, the value of the quantity/parameter and/or the event (man-caused and/or natural) continues to satisfy a threshold criterion and to disable the first communications mode and/or enable the second communications mode after the wireless communications device determines that the comparison of position, the value of the quantity/parameter and/or the event no longer satisfies the threshold criterion.

In further embodiments, responsive to the comparison of position, the value of the quantity/parameter and/or the event satisfying the threshold criterion, the wireless communications device may be configured to send information (automatically or upon user command) selectively to one or more other devices that, according to some embodiments, may be predetermined other devices. In still other embodiments, responsive to the comparison of position, the value of the quantity/parameter and/or the event satisfying the threshold criterion, the wireless communications device may be configured to receive information (automatically or upon user command) selectively from one or more other devices that, according to some embodiments, may be predetermined other devices.

Example/Application No. 3: A shopping cart, for example, of the type used in a grocery and/or super-market store, may be configured to sense/detect one or more items that are placed in the shopping cart. As used herein, the term "configured to sense/detect" may, in some embodiments, comprise sensing/detecting, for example, a weight, a manufacturer, an expiration date, a price and/or a nutritional value, etc. associated with the one or more items, wherein the sensing/detecting may be performed based upon any technology, such as, for example, a Radio Frequency (RF) tagging technology, a bar-code technology, an image recognition technology and/or any other technology.

Each shopping cart may include an identity (e.g., a number). Mr. Jones (a customer), who chooses a shopping cart having as identity a number such as, for example, "8787," may insert the number 8787 into a wireless communications device that Mr. Jones is carrying/using. Upon inserting the number 8787 into the wireless communications device, the wireless communications device may be configured to selectively establish a communications link, that may, in some embodiments, be a short-range communications link, with the shopping cart having identity 8787. From that time on, as the shopping cart senses/detects the one or more items that are placed in the shopping cart, information associated with the sensing/detecting of the one or more items, including price information associated with the one or more items, is transferred to Mr. Jones' wireless communications device via the communications link that is selectively established between Mr. Jones' wireless communications device and shopping cart 8787.

In the event that Mr. Jones decides to put back on a shelf an item that has been placed in shopping cart 8787, that item is sensed/detected by the shopping cart as having been withdrawn/deleted from the shopping cart and at least some information associated therewith is withdrawn/deleted, or at least changed, from Mr. Jones' wireless communications device via one or more commands/messages sent to the wireless communications device by the shopping cart, via the communications link.

When Mr. Jones has finished shopping, Mr. Jones can examine the wireless communications device and may instruct the wireless communications device to perform a transaction, such as, for example, to pay for the one or more items that Mr. Jones has placed in shopping cart 8787. In some embodiments, the shopping cart including the one or more items and the wireless communications device may need to be proximate to a specific location within the grocery and/or super market store (e.g., proximate to a "check-out" counter/location) before the wireless communications device and/or shopping cart (individually and/or jointly in communication therebetween) may enable a "pay" function by detecting a (short-range) signal that may be transmitted by/from the specific location.

Other Embodiments: FIGS. 1 and 2 illustrate further embodiments of the present invention. Additional embodiments may comprise systems and/or methods. For example, in one embodiment as illustrated in FIG. 1, a method in a system 10 is provided comprising: detecting that a proximity criterion is satisfied between a first device 14, such as a mobile subscriber device, and Entity 1; and enabling a mode of the first device and/or a mode of a second device 15 responsive to the detecting; where, according to some embodiments, the second device 15 is not the Entity 1 and is not associated with the Entity 1 and wherein the Entity 1 is not involved in providing a communications service to the first and/or second device. In one particular embodiment, a mobile subscriber device 14 linked to a communications system 18 via base station 12 can enable a function when the device 14 comes within a proximity of Entity 1. The function enabled can be any number of functions at the mobile subscriber device 14 or even at the mobile subscriber device 15. The mobile subscriber device 15 can also be linked to the communications system 18 via a base station 13. The function enabled can be a financial transaction, the transmission of communications, such as data, and/or some other function that may provision the mobile subscriber device 14 and/or the mobile subscriber device 15 with additional functionality not previously available/activated at the respective devices.

In one embodiment, the detection by mobile subscriber device 14 of a proximity criterion relative to Entity 1 can enable the mobile subscriber device 14 to authorize and complete a financial transaction such as the payment of a toll and/or of an item at a check out line. The same detection by mobile subscriber device 14 of the proximity criterion relative to Entity 1 can also or alternatively enable the mobile subscriber device 15 to authorize and complete a financial transaction such as the payment of a toll and/or a payment for an item at a check out line. The enablement of the mobile subscriber device 15 may also be contingent on the mobile subscriber device 15 having satisfied a proximity criterion relative to a second entity, such as Entity 2. Thus, the proximity criterion can include various requirements depending on the particular application. The requirements may include at least one of having the device 14 being within a predetermined distance of Entity 1, the device 14 receiving a predetermined signal strength from Entity 1, being at such predetermined distance for a predetermined time interval and receiving a predetermined signal strength during the predetermined time interval. The requirements can also include having device 15 being within a predetermined distance and/or predetermined signal strength of Entity 2, and/or being within such predetermined distance and/or signal strength during a predetermined time interval. It will be understood that at least one of devices 16 and 17, shown in FIG. 1 as being attached to Entity 1 and Entity 2, respectively, may, according to some embodiments, comprise a wireless transmitter and/or receiver.

According to some embodiments, the detecting may be performed by the first device (i.e., radioterminal 14), by the second device (i.e., radioterminal 15), by a device that is associated with an entity (i.e., device 16 and/or device 17) and/or by a system that is associated with the first and/or second devices (i.e., system 18, base station 12 and/or base station 13). Also, in some embodiments, the enabling may be performed by the first device, by the second device, by a device that is associated with the entity and/or by a system that is associated with the first and/or second devices.

In some embodiments, the first device comprises a wireless communications device, the second device comprises a wireless communications device and/or the system that is associated with the first and/or second devices comprises a wireless communications system that is configured to provide a communications service to the first and/or second devices.

In further embodiments, detecting comprises: using position information associated with the first device; using position information associated with the second device; detecting a signal (and/or a signal strength measurement such as RSSI) that is being radiated by the first device; detecting a signal (and/or a signal strength) that is being radiated by the second device; and/or detecting a signal (and/or a signal strength) that is being radiated by a device that is associated with the entity, wherein using position information may, according to some embodiments, comprise: evaluating a distance between the position information and one or more position values; and determining whether the distance is less than or equal to a threshold. In some embodiments, the one or more position values is/are predetermined.

In further embodiments, responsive to the enabling, the method comprises performing a function; wherein the function, according to some embodiments, comprises a financial transaction, receiving data and/or transmitting data. In some embodiments, receiving data comprises receiving data selectively from a first unit and wherein transmitting data comprises transmitting data selectively to a second unit. In some embodiments, the first and second units are the same unit, whereas in other embodiments the first and second units are different units. In further embodiments, the first and/or second units may be predetermined units and the first unit may comprise a wireless communications device and/or the second unit may comprise a wireless communications device. In yet further embodiments, the first unit may be associated with an Internet Protocol (IP) address and/or the second unit may be associated with an IP address.

Referring to FIG. 2, the first device 14 can traverse a path 23 within an overall coverage area 20 and the second device 15 can traverse a path 25 within the overall coverage area 20. The overall coverage area 20 can include areas 22 and 24 that can be associated with respective entities. The entry of the first device 14 within area 22 can selectively enable a mode and/or a function at device 14 and can optionally enable a mode and/or a function at device 15 based, according to some embodiments, on a proximity criterion to area 24. For example, if device 14 owned and/or operated by a user is at a first store within area 22 and the device 15 owned/operated by, for example, the user's spouse is at a second store within area 24, then the user's spouse at device 15 can complete a purchase within area 24 based on the user's presence with device 14 within area 22. Similarly, if the two users at devices 14 and 15 at respective areas 22 and 24 want to sample music, games and/or even play a game between each other, their respective device can be provisioned for such sampling as long as they stay within the proximity criteria set for each of the respective devices. Once one or the other device goes beyond the respective proximity criterion, the mode and/or function enabling the sampling will be disabled at one or both devices.

In some embodiments according to the present invention, receiving data comprises receiving a position, a request and/or an acknowledgement and wherein transmitting data comprises transmitting a position, an authorization and/or an acknowledgement.

In further embodiments according to the present invention, the financial transaction comprises providing payment associated with a toll and/or providing payment associated with a purchase of one or more items.

In accordance with additional embodiments of the present invention, receiving data comprises receiving data once or repeatedly and transmitting data comprises transmitting data once or repeatedly.

It will be understood that relative to any one of the plurality of methods described above, the term "entity" may comprise a person, an animal, a building, a motor vehicle, a shopping cart, a product, a check-out counter, a geographic position, a geographic area and/or one or more locations in time and/or space.

In a further embodiment according to the present invention, a system is provided comprising: a detector that is configured to enable a mode of a first device and/or to enable a mode of a second device responsive to a detection that a proximity criterion is satisfied between the first device and an entity; wherein, according to some embodiments, the second device is not the entity and is not associated with the entity, and wherein, according to further embodiments, the entity is not involved in providing a communications service to the first and/or second device. In some embodiments, the detector is included in, and the detection is performed by, the first device, the second device, a device that is associated with the entity and/or a system that is associated with the first and/or second devices. Similarly, according to some embodiments, the detector is included in, and the mode is enabled by, the first device, the second device, a device that is associated with the entity and/or a system that is associated with the first and/or second devices.

Referring to FIG. 3, a flow chart illustrating a method 30 in accordance with an embodiment herein includes detecting that a proximity criterion is satisfied between a first device and an entity at 32. Note, that although the steps described are in a certain order in this embodiment, embodiments contemplated within the scope of the claims are not necessarily limited to a particular order or necessarily include every step described in method 30 and may further include additional steps as may be obvious to one of ordinarily skilled in the art. Method 30 can further include enabling a mode of the first device and/or a mode of a second device responsive to detecting satisfaction of the proximity criterion and while the proximity criterion is satisfied at 34, where the first device and the second device form a part of a communication system providing communications service to the first device and the second device. The second device can be independent of the entity and the entity can be independent of the communications service provided to the first and second device at shown at 36. The method at 38 can enable a mode of the first device and a mode of the second device responsive to detecting that the proximity criterion is satisfied between the first device and the entity. The first device and the second device can be mobile subscriber devices (i.e., radioterminals) and the entity can be a proximity beacon enabling a financial transaction between the first device or the second device and a vendor in communication with the first device or the second device at an access point maintained by the vendor or on behalf of the vendor. The access point can be a toll both, a point of purchase counter, or a check out counter and the first device and the second device can be cellular phones authorized selectively by its user and by satisfying the proximity criterion to proceed with a financial transaction associated with the vendor at the access point. As previously noted, although cellular phones are described, other communication devices are certainly within contemplation of the scope of the claims. The step of detecting can be done in any number of various ways. Detecting can include using position information associated with the first device relative to the entity or using position information of the second device relative to the entity or detecting a signal being radiated by the entity or detecting a signal being radiating by the first device and reflected by the entity or detecting a signal being radiating by the second device and reflected by the entity. In this regard, the method 30 can further evaluate a distance between the position information and one or more position values and determine whether the distance is less than or equal to a threshold at 39.

In some embodiments, the first device comprises a wireless communications device and/or the second device comprises a wireless communications device and the system that is associated with the first and/or second devices comprises a wireless communications system.

In further embodiments, the detection comprises: use of position information associated with the first device; use of position information associated with the second device; a detection of a signal that is being radiated by the first device; a detection of a signal that is being radiated by the second device; and/or a detection of a signal that is being radiated by a device that is associated with the entity. In some embodiments, use of position information comprises: an evaluation of a distance between the position information and one or more position values; and a determination of whether the distance is less than or equal to a threshold. It will be understood, that according to some embodiments of the invention, the one or more position values may be predetermined position values.

In yet additional embodiments of the present invention, the first device and/or the second device may be configured to perform a function responsive to the mode having been enabled by the detector, wherein, according to some embodiments, the function may comprise a financial transaction, reception of data and/or transmission of data. In some embodiments, reception of data comprises reception of data selectively from a first unit and transmission of data comprises transmission of data selectively to a second unit. In accordance with some embodiments, the first and second units are the same unit and in accordance with other embodiments, the first and second units are different units. It will be understood that in some embodiments the first and/or second units may be first and second predetermined units.

In yet further embodiments of the invention, the first unit may comprise a wireless communications device and/or the second unit may comprise a wireless communications device. According to additional embodiments, the first unit is associated with an Internet Protocol (IP) address and/or the second unit is associated with an IP address.

In some embodiments of the present invention, receiving data comprises receiving a position, a request and/or an acknowledgement and wherein transmitting data comprises transmitting a position, an authorization and/or an acknowledgement. According to other embodiments, the financial transaction comprises a payment of a toll and/or a payment associated with a purchase of one or more items. It will be understood that, in some embodiments, the reception of data comprises reception of data once or repeatedly and that, according to some embodiments, the transmission of data comprises transmission of data once or repeatedly. It will also be understood that according with any one of the embodiments described above (or any combination thereof) the term "entity," as used therein may comprise a person, an animal, a building, a motor vehicle, a shopping cart, a product that is on sale, a check-out counter, a geographic position, a geographic area and/or one or more locations in time and/or space.

In some embodiments according to the present invention, a system may comprise the detector, the first device, the second device, the entity, the device that is associated with the entity and/or the system that is associated with the first and/or second devices.

In the specification, there have been disclosed embodiments and, although specific terms are employed, they are used in a generic and descriptive sense only and not for purposes of limitation. The following claims are provided to set forth, at least in part, the scope of the present invention.

The invention claimed is:

1. A method of operating a smartphone in performing at least one financial transaction; the method including a two-step process in establishing and using a capability in order to perform said at least one financial transaction; the method comprising:

responsive to sensing at least one parameter by at least one sensor of the smartphone and responsive to determining that the at least one parameter that is sensed satisfies a criterion, performing a first step of said two-step process by enabling a mode to communicate by the smartphone information requesting an authorization to establish said capability;

while the mode is enabled, and as a precursor to performing a second step of said two-step process, transmitting by the smartphone first data to a first device requesting the authorization to establish said capability to perform said at least one financial transaction; and receiving by the smartphone second data from the first device, comprising the authorization, responsive to said transmitting by the smartphone the first data; then performing the second step of said two-step process comprising performing a first transaction of said at least one financial transaction, responsive to detecting by the smartphone that a proximity condition is satisfied and responsive to sensing the at least one parameter and determining that the at least one parameter sensed satisfies the criterion;

wherein said performing the second step of said two-step process comprises sensing that the proximity condition is satisfied relative to an access point maintained by a vendor at a point of purchase counter, by detecting a short-range signal that is transmitted by the access point, determining that a value of the at least one parameter that is sensed satisfies the criterion and then, responsive to having sensed that the proximity condition is satisfied relative to the access point and having determined that the value of the at least one parameter sensed satisfies the criterion, paying for a product by selectively sending information to at least one device;

wherein said paying for a product by selectively sending information to at least one device comprises selectively and wirelessly transmitting information to the at least one device using unlicensed frequencies; and wherein said at least one parameter comprises a signal, a number, a word, a code, a velocity, an acceleration, a time-of-day, a humidity, a temperature, a height, a level of brightness, a level of darkness, a blood pressure, a heart rate, a blood content, a physiological state and/or a psychological state.

2. The method of claim 1, wherein said enabling a mode to communicate by the smartphone information requesting an authorization comprises enabling a first function of the smartphone while disabling a second function of the smartphone responsive to the at least one parameter having been sensed by the at least one sensor of the smartphone and further responsive to having determined that the at least one parameter that is sensed satisfies the criterion; and then selectively communicating with the first device by using a communications capability of the first function, selectively establishing a master-slave relationship with the first device, and selectively requesting from the first device the authorization to establish the capability to conduct said at least one financial transaction.

3. The method of claim 2, further comprising:

repeatedly sensing the at least one parameter and repeatedly deciding, based on comparing a value of the at least one parameter sensed to the criterion, whether or not to maintain enabled said first function while maintaining disabled said second function; and maintaining enabled said first function while maintaining disabled said second function responsive to deciding that said value of the at least one parameter continues to satisfy the criterion; or disabling said first function and enabling said second function responsive to deciding that the value of the at least one parameter no longer satisfies the criterion.

4. The method of claim 1, wherein said transmitting by the smartphone first data to a first device is responsive to the at least one parameter having been sensed by the at least one sensor of the smartphone and is further responsive to having determined that the at least one parameter that is sensed satisfies the criterion; and wherein said receiving by the smartphone second data from the first device is responsive to said transmitting by the smartphone the first data and comprises receiving by the smartphone information relating to an acknowledgement and/or authorization to establish and use the capability to perform said at least one financial transaction.

5. The method of claim 1, further comprising:

responsive to performing a financial transaction, causing data to be transmitted selectively to at least one device and further causing data to be received selectively from at least one device.

6. The method of claim 1, wherein said transmitting by the smartphone first data to a first device and receiving by the smartphone second data from the first device comprises wirelessly transmitting/receiving by the smartphone using unlicensed frequencies, licensed frequencies, a WiFi air interface protocol, an Orthogonal Frequency Division Multiplexing air interface protocol and/or an Orthogonal Frequency Division Multiple Access air interface protocol.

7. The method of claim 1, wherein said paying for a product further comprises deducting/withdrawing an amount of money from an account.

8. The method of claim 7, wherein said using unlicensed frequencies comprises using unlicensed frequencies in a Time Division Duplex operation;

wherein said selectively sending information to at least one device comprises selectively, sending information to the access point maintained by the vendor at the point of purchase counter and to at least one other device that is predetermined; and/or wherein the method further comprises selectively receiving information from the access point maintained by the vendor at the point of purchase counter and from at least one other device that is predetermined.

9. A smartphone that is configured to perform operations, comprising a two-step process, associated with establishing and using a capability in order to perform at least one financial transaction; the operations comprising:

responsive to sensing at least one parameter by at least one sensor of the smartphone and responsive to determining that the at least one parameter that is sensed satisfies a criterion, performing a first step of said two-step process by enabling a mode to communicate information requesting an authorization to establish said capability;

while the mode is enabled, and as a precursor to performing a second step of said two-step process, transmitting first data to a first device requesting the authorization to establish said capability to perform said at least one financial transaction; and receiving second data from the first device, comprising the authorization, responsive to said transmitting the first data; then performing the second step of said two-step process comprising performing a first financial transaction of said at least one financial transaction, responsive to detecting by the smartphone that a proximity condition is satisfied and responsive to sensing the at least one parameter and determining that the at least one parameter sensed satisfies the criterion;

wherein said performing the second step of said two-step process comprises sensing that the proximity condition is satisfied relative to an access point maintained by a vendor at a point of purchase counter, by detecting a short-range signal that is transmitted by the access point, determining that a value of the at least one parameter that is sensed satisfies the criterion and then, responsive to having sensed that the proximity condition is satisfied relative to the access point and having determined that the value of the at least one parameter sensed satisfies the criterion, paying for a product by selectively sending information to at least one device;

wherein said paying for a product by selectively sending information to at least one device comprises selectively and wirelessly transmitting information to the at least one device using unlicensed frequencies; and wherein said at least one parameter comprises a signal, a number, a word, a code, a velocity, an acceleration, a time-of-day, a humidity, a temperature, a height, a level of brightness, a level of darkness, a blood pressure, a heart rate, a blood content, a physiological state and/or a psychological state.

10. The smartphone of claim 9, wherein said enabling a mode to communicate by the smartphone information requesting an authorization comprises enabling a first function of the smartphone while disabling a second function of the smartphone responsive to the at least one parameter having been sensed by the at least one sensor of the smartphone and further responsive to having determined that the at least one parameter that is sensed satisfies the criterion; and then selectively communicating with the first device by using a communications capability of the first function, selectively establishing a master-slave relationship with the first device, and selectively requesting from the first device the authorization to establish the capability to conduct said at least one financial transaction.

11. The smartphone of claim 10, wherein the operations further comprise:

repeatedly sensing the at least one parameter and repeatedly deciding, based on comparing a value of the at least one parameter sensed to the criterion, whether or not to maintain enabled said first function while maintaining disabled said second function; and maintaining enabled said first function while maintaining disabled said second function responsive to deciding that said value of the at least one parameter continues to satisfy the criterion; or disabling said first function and enabling said second function responsive to deciding that the value of the at least one parameter no longer satisfies the criterion.

12. The smartphone of claim 9, wherein said transmitting first data to a first device is responsive to the at least one parameter having been sensed by the at least one sensor of the smartphone and is further responsive to having determined that the at least one parameter that is sensed satisfies the criterion; and wherein said receiving by the smartphone second data from the first device is responsive to said transmitting by the smartphone the first data and comprises receiving by the smartphone information relating to an acknowledgement and/or authorization to establish and use t capability to perform said at least one financial transaction.

13. The smartphone of claim 9, wherein the operations further comprise:

responsive to performing a financial transaction, causing data to be transmitted selectively to at least one device and further causing data to be received selectively from at least one device.

14. The smartphone of claim 9, wherein said transmitting first data to a first device and said receiving second data from the first device comprises wirelessly transmitting/receiving by the smartphone using unlicensed frequencies, licensed frequencies, a WiFi air interface protocol, an Orthogonal Frequency Division Multiplexing air interface protocol and/or an Orthogonal Frequency Division Multiple Access air interface protocol.

15. The smartphone of claim 9, wherein said paying for a product further comprises deducting/withdrawing an amount of money from an account.

16. The smartphone of claim 9, wherein said using unlicensed frequencies comprises using unlicensed frequencies in a Time Division Duplex operation;

wherein said selectively sending information to at least one device comprises selectively sending information to the access point maintained by the vendor at the point of purchase counter and to at least one other device that is predetermined; and/or wherein the operations further comprise selectively receiving information from the access point maintained by the vendor at the point of purchase counter and from at least one other device that is predetermined.

* * * * *